United States Patent [19]

Auriol et al.

[11] 4,031,177

[45] June 21, 1977

[54] PROCESS FOR THE MANUFACTURE OF ARTICLES OF TRANSLUCENT ALUMINA

[75] Inventors: Alain Auriol; Paul Tritten, both of Tarbes, France

[73] Assignee: Compagnie Generale d'Electroceramique, Paris, France

[22] Filed: Oct. 17, 1975

[21] Appl. No.: 623,274

Related U.S. Application Data

[63] Continuation of Ser. No. 273,581, July 20, 1972, abandoned, which is a continuation-in-part of Ser. No. 84,456, Oct. 27, 1970, abandoned.

[30] Foreign Application Priority Data

Oct. 31, 1969 France .............................. 69.37585
Aug. 3, 1971 France .............................. 71.28434

[52] U.S. Cl. .............................. 264/65; 51/309 A; 106/65; 264/66
[51] Int. Cl.² .................. F27B 9/04; F27D 7/06

[58] Field of Search ................. 106/65; 264/65, 66; 51/309 A

[56] References Cited

UNITED STATES PATENTS

| | | | |
|---|---|---|---|
| 3,026,210 | 3/1962 | Coble ................................... | 106/65 |
| 3,377,176 | 4/1968 | Wolkodoff ........................... | 264/65 |
| 3,615,306 | 10/1971 | Jones et al. .......................... | 51/309 |
| 3,641,227 | 2/1972 | Horsley et al. ...................... | 264/65 |
| 3,679,383 | 7/1972 | Hack et al. .......................... | 51/309 |
| 3,711,585 | 1/1973 | Muta .................................... | 264/65 |

*Primary Examiner*—Donald J. Arnold
*Attorney, Agent, or Firm*—Sughrue, Rothwell, Mion, Zinn & Macpeak

[57] ABSTRACT

Final sintering of an alumina powder containing a small portion of magnesia, baryta, lanthana, yttria, or salts of magnesium, barium, lanthanum or yttrium, in a non-oxidizing carbon monoxide atmosphere at a temperature above 1700° C produces a translucent alumina article.

6 Claims, No Drawings

PROCESS FOR THE MANUFACTURE OF ARTICLES OF TRANSLUCENT ALUMINA

CROSS-REFERENCE TO RELATED APPLICATION

This is a continuation of application Ser. No. 273,581, filed July 20, 1972 which is a continuation-in-part application of our earlier co-pending application Ser. No. 84,456, filed Oct. 27, 1970 and both now abandoned and claiming priority from Oct. 31, 1969, based on French Pat. No. PV No. 69 37 585.

BACKGROUND OF THE INVENTION

1. Field of the Invention

The present invention is directed to a process for the manufacture of articles of translucent alumina by sintering of molded articles from an alumina powder containing a small amount of a grain growth inhibiting substance, such as magnesia, or a salt of magnesium, or an equivalent metal, which is decomposable by heating with formation of magnesia, or an equivalent metal oxide, which comprises preliminarily sintering, in an oxidizing atmosphere, at a temperature above 700° C followed by a final sintering at a temperature above 1700° C in a non-oxidizing medium.

2. Description of the Prior Art

According to U.S. Pat. No. 3,026,210, articles of translucent alumina in the visible and near infra-red spectra are prepared by a process similar to that of the present invention, in which the molded articles, consisting of alumina containing from one-sixteenth % to one-half % of magnesia, are subjected to a preliminary sintering step at a temperature range of between 1000° C and 1200° C, and then, further subjected to a final sintering step at a temperature between 1800° C and 1950° C in the presence of a hydrogen atmosphere, or under a vacuum, the preliminary sintering step sometimes being omitted. Such sintering steps are normally carried out in furnaces, the interior surface and the inner articles of which are generally composed of carbon, preferably graphite, because of its refractoriness, chemical inertia, relatively low cost and ease of manufacture, even with respect to large articles out of the same material. However, a sintering of alumina articles in a carbon furnace necessitates the employment of an atmosphere consisting of extremely pure hydrogen or of a very high vacuum to avoid large scale transfers of alumina from the articles to be sintered onto the walls and inner articles of the furnace.

While the above-mentioned patent employs a process similar to that of the present invention, it should be emphasized that the process disclosed therein is only operative for making transparent alumina bodies, when the final sintering step is carried out in an atmosphere of hydrogen or under vacuum. See for instance, U.S. Pat. Nos. 3,026,177 and 3,331,482. Because of the manner in which the process of U.S. Pat. No. 3,026,210 is carried out, extreme inferior transparency of the final product is observed. To the contrary, with the process of the present invention, as described below, transparency values approximating 93 to 94% in the visible spectrum are obtained.

U.S. Pat. No. 3,454,358 discloses the production of infra-red transparent bodies of zinc selenide, wherein a non-oxidizing, heat treating atmosphere, such as argon is employed to avoid roasting of the zinc selenide into zinc oxide and selenium dioxide.

Lastly, French Pat. No. 852,178 discloses sintering bodies of alumina (without any concern or disclosure of its purity), other metallic oxides and mixtures of metallic oxides and carbides in a carbon monoxide atmosphere; however, the process described therein relates to an art, quite divergent from that of the present invention (i.e., cutting tools) in which there is, of course, no problem in providing transparent bodies.

SUMMARY OF THE INVENTION

It is therefore, an object of the present invention to obviate the aforementioned disadvantages associated with the prior art and to insure the manufacture of articles of translucent alumina exhibiting a density near that of the corundum monocrystal, by sintering, in the presence of an atmosphere of a more common and cheaper gas than pure hydrogen, while, at the same time, not requiring that the sintering furnace be maintained under a very high vacuum, with the special devices implied thereby. Final sintering is carried out in a carbon monoxide atmosphere, optionally containing an inert gas and/or a gas liable to partial or total decomposition with formation of carbon, or in the presence of carbon or a solid compound liable to partial or total decomposition with formation of carbon. In addition, it may comprise one of the following features: (1) the preliminary sintering takes place at a temperature between about 800° C and 1110° C; (2) the final sintering takes place under a partial carbon monoxide pressure of about 670 millibars, and preferably at about 1850° C for about 5 hours; (3) the carbon is derived from graphite.

DESCRIPTION OF THE PREFERRED EMBODIMENTS

There is a preferably employed as a starting material, an alumina in the form of a very pure fine powder, containing at least 99.9% of α-alumina to which 0.02 – 0.6% by weight of calcined magnesia is added either directly or in the form of a magnesium salt, which decomposes in the course of the preliminary sintering with the formation of magnesia, for example magnesium carbonate, magnesium chloride, and the like. The mixture is thereafter granulated with the introduction of an organic binder, such as glycol stearate and the grain thus obtained is shaped by any appropriate ceramic process, for example, isostatic pressing.

The binder contained in the pressed articles is eliminated by pre-sintering in an oxidizing atmosphere at a temperature above 700° C. and preferably, about 800° C to 1100° C in order that after pre-sintering, the articles may have sufficient mechanical strength to permit the necessary handling and machining operations.

The articles are then subjected to a final sintering step up to a temperature above 1700° C., at which time they are maintained for a period of several hours in a carbon monoxide atmosphere under a carbon monoxide partial pressure above or equal to 670 millibars. The furnace is then purged of any gas other than carbon monoxide and inert gas or gaseous compounds such as hydrocarbons, liable to decompose at the sintering temperature with the formation of carbon.

Further to the carbon monoxide atmosphere, carbon is preferably present in the sintering oven during the final sintering step. The carbon can be present as an element, for example, in the form of graphite, or in a gaseous chemical compound, for instance, a hydrocarbon, liable to decompose partially or totally with formation of carbon.

A preferred device for placing into operation, the process of the present invention comprises means of feeding into the sintering over, free or chemicaly bound carbon. Such means can be provided by injectors fed with pulverulent graphite of compounds as hereinabove defined.

In yet another preferred device for placing into operation the process of the present invention, the components of the oven brought to the highest temperature, such as a susceptor for heating by induction or a resistor for heating by electrical resistance, the container and its support, are made of carbon, such as graphite. They are not therefore damaged by the carbon monoxide atmosphere.

A better understanding of the present invention will be gained from the following examples, which are merely intended to be illustrative and not limitative of the present invention.

EXAMPLE 1

From a mixture of γ-alumina and an addition of 0.06% of MgO, a pressing grain was produced by adding to the aforesaid mixture, 8%, by weight of said mixture, of a glycol stearate binder. The grain was pressed in the form of wafers exhibiting a thickness of 1.5 mm with a crude density of 2.2. The pressed articles were purified by pre-sintering in an oxidized atmosphere of air at 1350° C. The articles were then sintered up to 1850° C with a five-hour stage at this temperature in a furnace having a carbon monoxide atmosphere under a pressure of 670 millibars.

There was thus obtained, translucent articles exhibiting a density on the order of 3.98 to 3.99, which is extremely close to the theoretical density (that of the monocrystal).

EXAMPLE 2

There were prepared, cylindrical tubes of 120 mm in length, having an inner diameter of 8 mm and an outer diameter of 10 mm. There was then prepared, a mixture of α-alumina (99.9% pure alumina) and 0.025% calcined magnesia (MgO) as a grain growth inhibiting agent. This mixture was then shaped into cylinders by conventional means, e.g., isostatic pressing, and preferably after the addition of an organic binder, such as glycol stearate.

The pressed articles were then subjected to a first sintering step for their purification, at 850° C in an oxidizing atmosphere. After sintering, during which the organic binder was elminated, the articles were observed as exhibiting sufficient mechanical strength to permit the necessary handling and machining operations. The articles were then submitted to a final sintering step, effected at 1825° C for 5 hours in a carbon monoxide atmosphere under a pressure of 800 millibars in the presence of graphite within the sintering furnace. After final sintering, there was measured the total light transmission through the tubes, in an apparatus similar to the spherical lumenmeter of Ulbricht and Blondel, which comprises a photoelectric cell provided with a filter suppressing any response outside the visible part of the light spectrum.

The total transmission coefficient, calculated as the ratios of the light fluxes received from a source through a tube, then directly, is 93.0%. The density of the tubes range from 9.38 to 3.99, such values being extremely near to the theoretical density of the monocrystal.

EXAMPLE 3

In another experiment, analogous to the preceding one, but with an addition of 0.05% of calcined magnesia, and the duration of final sintering for 10 hours, there were obtained tubes exhibiting a total transmission coefficient of 94.0%

Although the process described in the foregoing specification appears to be preferable for the manufacture of articles having a high translucency, it must be understood that various modifications and changes may be made to the present invention without departing from the spirit and scope thereof.

For instance, the preliminary sintering can be conducted in an atmosphere having a higher oxygen content than air; the carbon monoxide pressure during final sintering may be altered, with the proviso that if it becomes lower than 670 millibars, there is observed a relatively important volatilization of alumina. Consequently, it is therefore extremely advantageous to maintain the total pressure to at least 670 millibars by adding an inert gas or hydrogen.

The calcined magnesia employed as the grain-growth inhibiting substance can be replaced by any other metal oxide equivalent in this respect, such as lanthanum oxide ($La_2O_3$), yttria ($Y_2O_3$), and baryta (BaO).

It is well known that the sintering temperatures can be somewhat lowered if the duration of the sintering time is correspondingly increased.

Lastly, all or part of the carbon, the presence of which is desired in the sintering oven, can be injected by any appropriate conventional means.

What is claimed is:

1. In a process for manufacturing articles of translucent alumina by sintering articles molded from a very pure fine powder containing a small portion of a grain-growth inhibiting substance, comprising the steps of:
   a. preliminarily sintering said powder in an oxidizing atmosphere at a temperature between about 700° C and about 1100° C., followed by
   b. final sintering at a temperature above 1700° C., in a nonoxidizing medium, the improvement which comprises conducting final sintering in a carbon monoxide atmosphere.

2. The process of claim 1, wherein the preliminary sintering takes place at a temperature of from 800° to 1100° C.

3. The process of claim 1, wherein the final sintering takes place under a partial carbon monoxide pressure above or equal to 670 millibars.

4. The process of claim 3, wherein the final sintering takes place at about 1850° C for about 5 hours.

5. The process of claim 1, wherein the final sintering takes place in a carbon monoxide atmosphere containing an inert gas.

6. The process of claim 1, wherein the final sintering takes place in a carbon monoxide atmosphere in the presence of carbon.

* * * * *